Patented May 7, 1946

2,399,947

UNITED STATES PATENT OFFICE 2,399,947

COMPOUNDING AND VULCANIZATION OF SYNTHETIC RUBBER

Albert A. Somerville, Carmel, N. Y., assignor to R. T. Vanderbilt Company, Inc., New York, N. Y., a corporation of New York No Drawing. Application February 17, 1944, Serial No. 522,788

8 Claims. (Cl. 260—41)

My invention relates to improvements in the compounding and vulcanization of synthetic rubbers produced by copolymerization of butadiene and styrene. Synthetic rubbers of this type are illustrated by the copolymer product currently designated GR-S rubber. In my application, Serial No. 522,785, filed February 17, 1944 I have described my discovery that the addition of 0.005–1%, more suitably 0.01–0.5%, of copper (as such or in the form of an appropriate compound) to compounds of this type of synthetic rubber afford important improvements with respect to rate of cure and variability, particularly in rate of cure, when these compounds are vulcanized with sulfur, as such, in amount exceeding that required to form cupric sulfide with the copper present. I have found that copper is with advantage added to compounds of such synthetic rubber, in applying my discovery, as a predispersion of a copper salt on an inert filler such as carbon black, clay or chalk. Dispersion of the copper in the synthetic rubber compound is thus facilitated while particles of metallic copper are eliminated from the compound. In one aspect the inert filler carrying the copper salt itself constitutes a new and valuable compounding material.

The following examples will illustrate practices embodying my invention and include comparisons indicating some of its advantages. In the tabulations of these compounds, cures and physical properties, the compound of each example was made up of the number of parts by weight indicated opposite each designated component, the cures were in a platen press for the periods indicated in minutes at the left under the curing temperature, all of the cures in each group being effected at the same temperature, and, for each period of cure, the values for stress at 300% elongation in pounds per square inch appear under "S," for tensile strength in pounds per square inch under "T," for percentage elongation at break under "E," and for Shore hardness under "H."

|  | Example I | | | | Example II | | | |
|---|---|---|---|---|---|---|---|---|
| GR-S rubber | 100 | | | | 100 | | | |
| Zinc oxide | 5 | | | | 5 | | | |
| Plasticizer | 5 | | | | 5 | | | |
| Channel carbon black | 50 | | | | | | | |
| Modified black | | | | | 50 | | | |
| Sulfur | 2 | | | | 2 | | | |
| Benzothiazyldisulfide | 1.5 | | | | 1.5 | | | |
| Zinc diethyldithiocarbamate | .15 | | | | .15 | | | |
| 307° F. | S | T | E | H | S | T | E | H |
| 5 minutes | Uncured | | | | 185 | 420 | 645 | 43 |
| 10 minutes | 260 | 1150 | 810 | 46 | 920 | 2740 | 605 | 59 |
| 15 minutes | 610 | 2280 | 655 | 55 | 1280 | 2860 | 505 | 62 |
| 20 minutes | 910 | 2940 | 605 | 59 | 1580 | 2710 | 450 | 65 |

The foregoing Examples I and II illustrate the application of my invention with a carbon black carrier. The modified carbon black of Example II was the same black used in Example I after being made into a slurry with a gasoline solution of copper oleate in amount sufficient to load the black with about 0.2% by weight on the black of copper sulfate measured as copper, dried and ground.

|  | Example III | | | | Example IV | | | | Example V | | | |
|---|---|---|---|---|---|---|---|---|---|---|---|---|
| GR-S rubber | 100 | | | | 100 | | | | 100 | | | |
| Plasticizer | 5 | | | | 5 | | | | 5 | | | |
| Zinc oxide | 5 | | | | 5 | | | | 5 | | | |
| Sulfur | 2 | | | | 2 | | | | 2 | | | |
| Benzothiazyldisulfide | 1.5 | | | | 1.5 | | | | 1.5 | | | |
| Zinc diethyldithiocarbamate | .15 | | | | .15 | | | | .15 | | | |
| Clay | 100 | | | | | | | | 100 | | | |
| Clay modified | | | | | 100 | | | | | | | |
| Copper powder (through 300 mesh) | | | | | | | | | .1 | | | |
| 307° F. | S | T | E | H | S | T | E | H | S | T | E | H |
| 10 minutes | Uncured | | 400 | | 625 | 760 | 50 | 375 | 550 | 700 | 46 | |
| 15 minutes | 175 | 225 | 575 | 38 | 520 | 995 | 750 | 55 | 470 | 810 | 720 | 51 |
| 20 minutes | 240 | 305 | 650 | 39 | 565 | 1060 | 700 | 57 | 575 | 950 | 735 | 54 |
| 30 minutes | 340 | 485 | 700 | 42 | 610 | 1010 | 650 | 58 | 575 | 1010 | 720 | 55 |

The foregoing Examples III, IV and V illustrate the application of my invention with a clay carrier. The modified clay of Example IV was the same clay used in Example III after being made into a slurry with an aqueous solution of copper sulfate in amount sufficient to load the clay with about 0.1% by weight on the clay of copper sulfate measured as copper, dried and ground.

Comparing Example II with Example I, and again comparing Example IV with Example III, the acceleration of the rate of cure will be apparent. The savings in time required for vulcanization of products from such stocks shown by these comparisons are an important economy. These same comparisons also show, in addition to this saving of time, substantial improvement in the physical properties of the vulcanizates.

It will also be noted, comparing Example IV to Example V, that the modified clay produces physical properties somewhat superior to those produced by the separate use of the clay and the equivalent amount of metallic copper. The parts by weight on the GR-S rubber of added copper, measured as copper, is the same in Example IV and Example V.

Chalk can be processed in the same way as clay to form a carbonate filler carrying a copper salt.

The copper loading may be applied to the inert filler as just described using any soluble copper salt in a volatile solvent which does not react with the filler. The predispersion of the copper salt upon the filler may also be accomplished by trituration. Copper carbonate, copper sulfate or copper stearate, for example, may be distributed upon the filler in this manner. I include copper soaps within the term "copper salt" herein.

The plasticizer used in the foregoing examples was a mixture of 15 parts by weight of a petroleum sulfonate, 5 parts of normal butyl alcohol and 80 parts of a viscous petroleum oil (currently sold under the trade-name "Reogen").

The proportion of sulfur used is not critical and may follow conventional practices providing it is added to the compound subjected to vulcanization in amount exceeding that required to combine with the added copper to form cupric sulfide.

I claim:

1. A vulcanizable compound comprising a rubbery copolymer of butadiene and styrene, a chemically inert filler carrying a copper salt, and an amount of sulfur exceeding the amount required to convert all of the copper to cupric sulfide, the total copper content of the compound being not less than about 0.005% nor more than about 1% on the weight of the copolymer.

2. The product of vulcanization of a compound comprising a rubbery copolymer of butadiene and styrene, a chemically inert filler carrying a copper salt, and an amount of sulfur exceeding the amount required to convert all of the copper to cupric sulfide, the total copper content of the compound being not less than about 0.005% nor more than about 1% on the weight of the copolymer.

3. A vulcanizable compound comprising a rubbery copolymer of butadiene and styrene, carbon black carrying a copper salt, and an amount of sulfur exceeding the amount required to convert all of the copper to cupric sulfide, the total copper content of the compound being about 0.01–0.5% on the weight of the copolymer.

4. The product of vulcanization of a compound comprising a rubbery copolymer of butadiene and styrene, carbon black carrying a copper salt, and an amount of sulfur exceeding the amount required to convert all of the copper to cupric sulfide, the total copper content of the compound being about 0.01–0.5% on the weight of the copolymer.

5. A vulcanizable compound comprising a rubbery copolymer of butadiene and styrene, clay carrying a copper salt, and an amount of sulfur exceeding the amount required to convert all of the copper to cupric sulfide, the total copper content of the compound being about 0.01–0.5% on the weight of the copolymer.

6. The product of vulcanization of a compound comprising a rubbery copolymer of butadiene and styrene, clay carrying a copper salt, and an amount of sulfur exceeding the amount required to convert all of the copper to cupric sulfide, the total copper content of the compound being about 0.01–0.5% on the weight of the copolymer.

7. A vulcanizable compound comprising a rubbery copolymer of butadiene and styrene, chalk carrying a copper salt, and an amount of sulfur exceeding the amount required to convert all of the copper to cupric sulfide, the total copper content of the compound being about 0.01–0.5% on the weight of the copolymer.

8. The product of vulcanization of a compound comprising a rubber copolymer of butadiene and styrene, chalk carrying a copper salt, and an amount of sulfur exceeding the amount required to convert all of the copper to cupric sulfide, the total copper content of the compound being about 0.01–0.5% on the weight of the copolymer.

ALBERT A. SOMERVILLE.